US007328085B2

(12) United States Patent
Fogel et al.

(10) Patent No.: US 7,328,085 B2
(45) Date of Patent: Feb. 5, 2008

(54) SYSTEM AND METHOD FOR PROCESSING RETURNED MAIL

(75) Inventors: Thomas C. Fogel, Stamford, CT (US); Stewart H. Gibson, Ridgefield, CT (US); Joann Martin, Ridgefield, CT (US); Jeff Stangle, Belmont, NC (US); Paul A. Kovlakas, Milford, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 11/299,981

(22) Filed: Dec. 12, 2005

(65) Prior Publication Data

US 2007/0135963 A1 Jun. 14, 2007

(51) Int. Cl.
*G06F 7/00* (2006.01)
*B07C 5/00* (2006.01)
*G06K 9/00* (2006.01)

(52) U.S. Cl. ....................... 700/227; 700/213; 209/584

(58) Field of Classification Search ................ 700/227, 700/226, 225, 224, 223, 219, 220, 221; 209/584
See application file for complete search history.

(56) References Cited

U.S. PATENT DOCUMENTS

| | | | | |
|---|---|---|---|---|
| 5,420,403 | A * | 5/1995 | Allum et al. | 235/375 |
| 5,925,864 | A * | 7/1999 | Sansone et al. | 235/375 |
| 6,610,955 | B2 * | 8/2003 | Lopez | 209/584 |
| 6,696,656 | B2 | 2/2004 | Steinmetz et al. | 209/584 |
| 6,728,597 | B2 * | 4/2004 | Didriksen et al. | 700/243 |
| 6,740,835 | B2 | 5/2004 | Steinmetz et al. | 209/584 |
| 6,791,050 | B2 * | 9/2004 | Daniels et al. | 209/584 |
| 6,826,548 | B2 | 11/2004 | Hungerpiller et al. | 705/401 |
| 6,901,151 | B1 * | 5/2005 | Rosenbaum et al. | 382/101 |
| 2003/0109954 | A1 | 6/2003 | Daniels, Jr. et al. | 700/226 |
| 2003/0114955 | A1 * | 6/2003 | Daniels, Jr. | 700/224 |
| 2003/0114956 | A1 | 6/2003 | Cullen et al. | 700/225 |
| 2003/0191651 | A1 | 10/2003 | Hungerpiller et al. | 705/1 |
| 2004/0117384 | A1 * | 6/2004 | Ray | 707/100 |
| 2005/0167342 | A1 * | 8/2005 | Vullriede et al. | 209/584 |

FOREIGN PATENT DOCUMENTS

| | | | |
|---|---|---|---|
| WO | 02/37372 | A1 | 5/2002 |
| WO | 2006/033982 | A2 | 3/2006 |

* cited by examiner

*Primary Examiner*—Gene O Crawford
*Assistant Examiner*—Ramya G. Prakasam
(74) *Attorney, Agent, or Firm*—George M. Macdonald; Angelo N. Chaclas

(57) ABSTRACT

Handling of undeliverable mail is improved so that mailers may take appropriate action to respond to nondelivery of mailpieces. Returned mail is received from a postal authority. Each mailpiece of the returned mail was part of a respective mailing and was determined not to be deliverable by the postal authority. The mailer determines for each mailpiece at least one of (a) the respective mailing to which the mailpiece belonged and (b) the reason why the mailpiece was found to be undeliverable. The mailer selects a course of action based on one or both of the results of these determinations. Returned mailpieces may be sorted by the mailings from which they come.

2 Claims, 7 Drawing Sheets

SYSTEM AND METHOD FOR PROCESSING RETURNED MAIL

BACKGROUND

This invention relates generally to mail processing and more particularly to apparatus and methods relating to mail that is not deliverable as addressed.

Mail that is returned to mailers as undeliverable presents significant challenges. In general, for large mailers who receive a large quantity of returned mail, a typical manner of handling the returned mail may be simply to discard or destroy it. However, this may leave unsolved whatever problem or failure caused the mail to be misaddressed or otherwise undeliverable.

Patents such as U.S. Pat. Nos. 6,696,656; 6,740,835; 6,791,050; and 6,826,548 have proposed certain processes to be performed in connection with returned mail. The present inventors have recognized that there are additional useful ways in which returned mail may be handled or processed.

SUMMARY

A method is provided that involves receiving returned mailpieces from a postal authority. Each of the returned mailpieces may have been included in a respective one of a plurality of mailings and may have been determined by the postal authority to be undeliverable. The method may further include sorting the returned mailpieces in accordance with a respective one of said mailings to which each returned mailpiece belonged. In other words, the returned mail may be sorted by the mailings in which they originated.

The sorting of the mailpieces may include machine-reading a code on the returned mailpieces. The code may be a barcode such as a PLANET ("Postal Alpha Numeric Encoding Technique") code, or may alternatively be a two-dimensional barcode. For example, if a two-dimensional barcode is read, the 2-D barcode may be provided as part of or in association with a postage meter indicium in accordance with the IBIP ("Information Based Indicia Program") program.

In another aspect, a method that involves receiving returned mail of the kind just described may also include, after receiving the mail, determining for each of the returned mailpieces at least one of the following: (a) a respective mailing to which the mailpiece in question belonged, and (b) a reason why the mailpiece in question was determined to be undeliverable. Further, the method may include selecting a course of action based on at least one of the determined respective mailing and the determined reason.

The selecting of the course of action may be based on both the mailing that is determined to have been the source of the mailpiece and the reason for the mailpiece being undeliverable. Among the various courses of action that may be selected are: (a) initiating a telephone call to the intended recipient of the returned mailpiece; (b) initiating a debt collection procedure; and (c) initiating a fraud investigation. Determining the mailing which was the source of the mailpiece may involve sorting returned mailpieces according to the mailings to which they belonged or determining a lockbox to which the mailpiece was returned. The reason for the non-deliverability of the mailpiece may be entered into a database. The reason for non-deliverability of the mailpiece may be determined by reading information from the mailpiece.

The method according to this aspect may also include scanning each returned mailpiece to generate an image, with the scanning performed at a first location. The method may also include transmitting the image to a second location that is remote from the first location, and reading information from the image at the second location to determine the reason why the mailpiece was undeliverable.

In accordance with other aspects of the invention, apparatus may be provided to perform at least a portion of the above-described methods.

The methods and/or apparatus described above may aid in making appropriate decisions about how to address the non-delivery of mailpieces from mass mailings. As a result, mailers may be better able to keep in touch with customers and to minimize disruptions in business processes such as billing and collection of accounts.

Therefore, it should now be apparent that the invention substantially achieves all the above aspects and advantages. Additional aspects and advantages of the invention will be set forth in the description that follows, and in part will be obvious from the description, or may be learned by practice of the invention. Various features and embodiments are further described in the following figures, description and claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION

The present invention is concerned with processing returned (undeliverable) mail in a manner that allows the mailer to take appropriate remedial action in response to non-delivery and return of a mailpiece. Among other actions in response to returned mail, the mailer (or its contractor/agent) may sort the returned mail according to the mailings from which the returned mailpieces were generated. The mailpieces may be further sorted according to the reasons for nondelivery provided by the postal authority (e.g., the U.S. Postal Service). At least some aspects of the sorting may be mechanized. For example, a barcode or the like on the mailpiece may indicate which mailing the mailpiece originated from and may be machine-read to allow for automatic sorting of the mailpiece into a stack containing only returned mailpieces from a particular mailing.

Data representing at least the type of mailing (and hence the type of mailpiece) may be entered into a database (automatically or by human data entry), along with data representing the reason for nondelivery, and these data may be associated with the intended recipient of the mailpiece to drive an automated decision-making process which determines what kind of contact with the intended recipient, or other action, should be initiated.

As a result of these processes, mailers may be able to take advantage of the information represented by a returned mailpiece, in contrast to conventional practices, in which returned mailpieces are simply discarded or destroyed.

Figure 1:
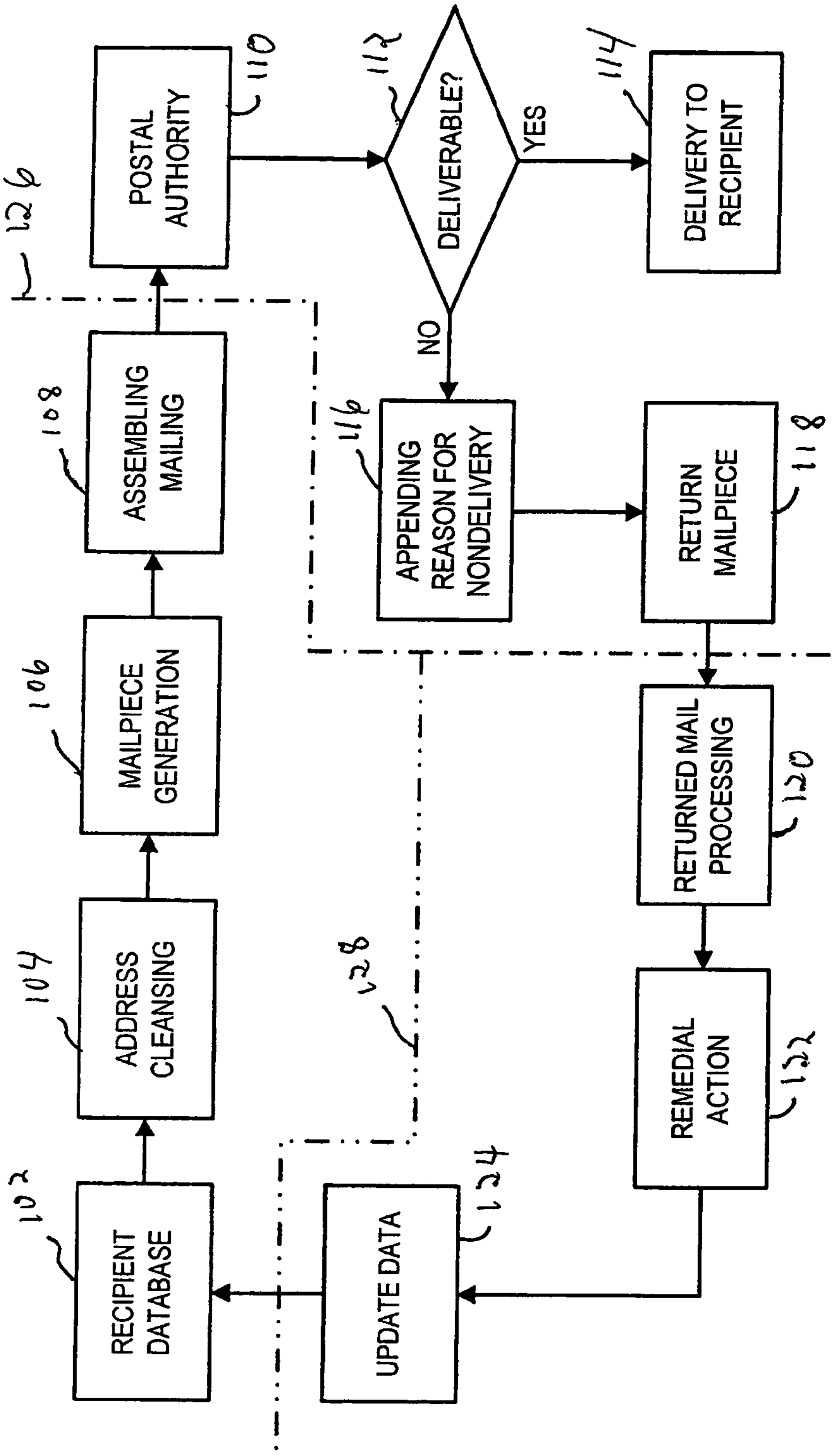
FIG. 1 is a diagram that illustrates a mailpiece processing flow according to aspects of the invention.

FIG. 1 is a diagram that illustrates a mailpiece processing flow according to aspects of the invention. Typically the genesis of a mailing is a database 102 of intended recipients for the mailpieces to be generated for the mailing. (As used herein and in the appended claims, a "mailing" refers to a group of envelopes that contain similar mailpieces—e.g., mailpieces that are identical or identical except for recipient and address, or account statements or bills generated from a group of accounts—and are addressed to different recipients. The number of mailpieces in a mailing is typically in the hundreds, thousands, hundreds of thousands or even millions.) The recipient database may be derived from or part of an account holder database or customer database or may alternatively embody a mailing list or be derived from a number of mailing lists. In accordance with conventional practices, in some cases the recipient database is "cleansed" (104 in FIG. 1) by cross-checking against one or more databases of current and/or past/changed addresses to try to incorporate current, accurate and complete address information for each intended recipient. Software and databases for "address cleansing" are commercially available and are in widespread use. Even so, it is not uncommon for a certain percentage of the addresses in a "cleansed" database to be out-of-date, inadequate or inaccurate.

Generation of the mailpieces themselves is indicated at 106. This involves printing the contents of the mailpiece, which may contain information, such as recipient name and address, that varies from mailpiece to mailpiece within the mailing. Some of this information may be drawn from the cleansed recipient database. There also may be account-specific information (e.g., transaction lists, account totals) in the mailpiece contents. Mailpiece generation also includes insertion of mailpiece contents into envelopes. Unless a window envelope is used, mailpiece generation may include printing the recipients' names and addresses on the envelopes, again with information drawn from the cleansed recipient database. In the case of an information mailing of identical notices (e.g., privacy notices) to all recipients, the contents may all be identical, such as pre-printed form letters and the like, and the only differences among the mailpieces may be the recipient names and addresses printed on the envelopes. Printing of recipient names and addresses on labels and affixing of the labels to the envelopes may also be employed.

At 108 the mailing is assembled. For example, the mailpieces may be presorted (although this may alternatively be an automatic result of the order of printing the mailpieces), franked, stacked, bundled, placed in postal shipment bags or trays, etc., or any one or more of the foregoing steps. Then, block 110 represents induction of the mailing into the postal authority (e.g., the U.S. Postal Service; or alternatively the postal carrier of another country or a private carrier such as FedEx or UPS).

During its normal processes for sorting and/or transporting the mailpieces of the mailing, the postal authority will effectively determine for each mailpiece, as indicated at 112, whether the mailpiece is deliverable. If deliverable, with or without forwarding, the mailpiece is delivered, as indicated at 114. If the mailpiece is determined to be "undeliverable as addressed" or if a similar determination is made, the postal authority will (116 in FIG. 1) typically mark, print or otherwise affix on or to the mailpiece an indication, endorsement and/or code to indicate a reason why the mailpiece is not deliverable. Typical reasons for non-delivery include the addressee being deceased, or having left the address with no forwarding order or with a forwarding order that has expired, or the address being incomplete (e.g., lacking street number or apartment number) or in error (e.g., address includes non-existent street or street number or apartment number). (In some cases, of course, some of these deficiencies in the address may not prevent delivery.) After the reason for nondelivery is marked (which may not occur in all cases), the mailpiece is returned (118 in FIG. 1) to the mailer or an agent or contractor of the mailer. (As will be appreciated by those who are skilled in the art, steps 116 and 118 are typically performed by the U.S. Postal Service with respect to first class mail. For other classes of mail in the U.S., these steps may not be performed in some cases. For example, in the case of undeliverable third class mail, the mailpieces may simply be destroyed, and no reason for nondelivery noted.)

At 120 in FIG. 1, the returned mail is processed by or on behalf of the mailer in accordance with aspects of the present invention to be described below. At 122 the mailer and/or its contractor or agent performs remedial action that is determined based on the processing which occurred at 120, and an operation to update the recipient database 102, based possibly on the remedial action 122, is indicated at 124.

Stepping back from the individual steps of FIG. 1 for a moment, it will be noted that a dash-dot line 126 is presented in the drawing. Actions to the right of the dash-dot line 126 may essentially be performed by the postal authority, while actions to the left of the dash-dot line 126 may be performed by or on behalf of the mailer. Moreover, a double-dot dash line 128 is presented to divide into two regions the area to the left of the dash-dot line 126. A mailer may find it convenient to contract out most or all of the activities to the left of the dash-dot line 126 and may divide the work between a mailing contractor that performs the work indicated above the double-dot dash line 128 and a returned mail processing contractor that performs the work indicated below the double-dot dash line 128. Some work, such as the update data step 124, may entail cooperation between the two contractors. One or both of the contractors may perform other work for the mailer, such as managing reprographics and/or handling, sorting and distributing inbound mail that is not returned mail.

Figure 2:
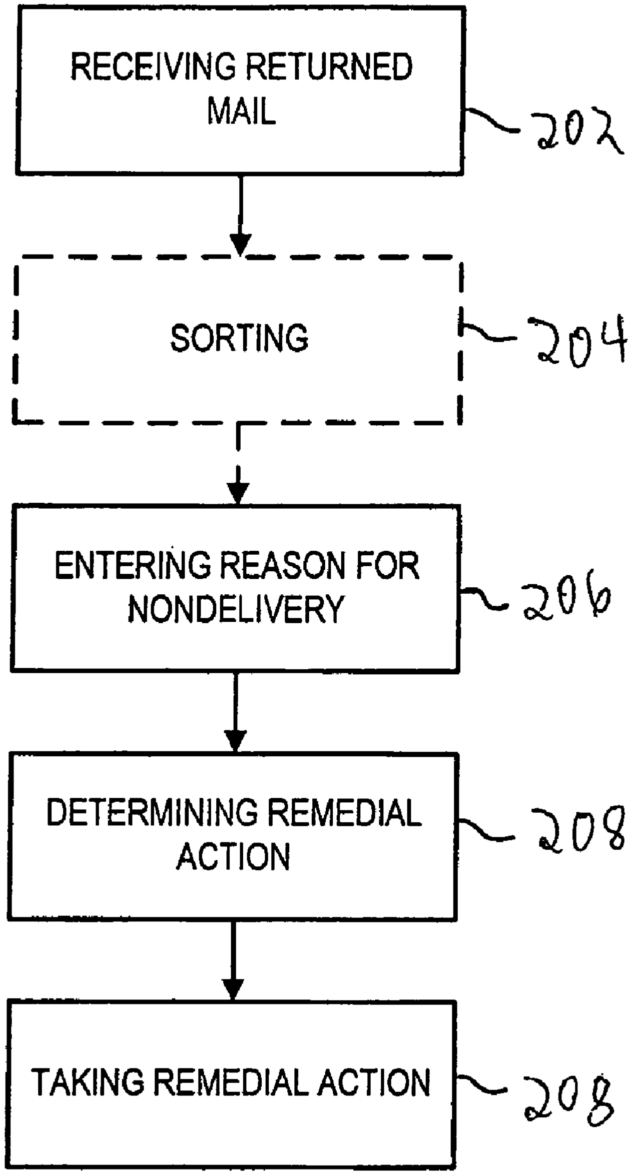
FIG. 2 is a flow chart that illustrates some details of the processing flow of FIG. 1.

FIG. 2 is a flow chart that illustrates some details of the processing flow of FIG. 1. At 202 in FIG. 2, the returned mail is received from the postal authority by or on behalf of the mailer. Then, in some cases (204 in FIG. 2), the returned mail may be sorted by, e.g., the mailing in which the returned mail was originally produced. In some embodiments, the mail may be manually sorted by, e.g., one or more of date of postmark, size and/or shape of envelope, etc. In other embodiments, the sorting may be at least partially by machine. For example, during the mail generation 106 a machine-readable code may have been printed on the mailpiece envelope (or in a recipient address, return address or other field on the mailpiece contents that is viewable through a window in the envelope) to identify the mailing to which the mailpieces belong. Consequently, an automatic sorting device (not shown) may machine-read the code from the mailpiece and may outsort mailpieces according to the mailing identification information present in the code. As a result the sorting device may sort the mailpieces by the mailing to which they belong. The code in which the mailing of origin is indicated may, for example, be a barcode such as a PLANET code, or may be another type of barcode such as a two dimensional barcode. The code may, but need not, be in a field separate from the recipient address field and the return address field. The code may, for example, be incorporated in the two-dimensional barcode provided as part of the postage meter indicium in the IBIP program.

In other embodiments, each mailing may have a respective lockbox assigned to it for return-mail purposes, and the lockbox address in question may be printed as the return address (again on the envelope itself or in a field viewable through an envelope window) on each mailpiece in the mailing. As a result, when the postal authority returns the returned mailpieces for each mailing to the respective lockbox for the mailing, the postal authority will effectively be sorting the returned mailpieces by mailing of origin, and the mailing of origin of each mailpiece is indicated and determined based on the lockbox to which it is returned by the postal authority.

In some embodiments, determining the mailing of origin of a returned mailpiece may entail a human operator opening the returned mailpiece and examining its contents. In addition, or alternatively, returned mailpieces may be opened in some cases to determine the account number of the intended recipient.

At 206 in FIG. 2, the reason for nondelivery of the mailpiece is entered in a database. For example, this may be done by associating a numeric code with a database entry that pertains to the intended recipient of the mailpiece. One way this may be done is by a human operator, at a workstation (not shown in FIG. 2), accessing a database that corresponds to the mailing and bringing up a screen display for the intended recipient of the mailpiece (whose name the operator may read from the mailpiece or from an image of the mailpiece). The operator may read the reason for nondelivery from the face of the mailpiece or from an image thereof and may make appropriate data entry into the screen display (e.g., by making a selection from a menu such as a pulldown menu).

At 208, a determination is made as to what remedial action (if any) should be performed because of the nondelivery of the mailpiece. The determination may be made automatically by a computer system (described below) and may be based on the reason for nondelivery entered at 206 and also based on the mailing from which the mailpiece originated. For present purposes and those of the appended claims, the type of mailing may be an equivalent to and/or a proxy for the particular mailing. For example, the mailing type "account statement" may be used to determine the remedial action rather than "account statement mailing of Nov. 14, 2005". More generally, mailings may be categorized as one of a number of categories, such as: promotional (e.g., solicitations, advertising), transactional (e.g., bills, account statements, product recalls), correspondence (e.g., notices of general applicability relating to business relationship with the client, reports of unusual events with respect to an account), and legal notices/compliance. In general the phrase "determining a mailing" should be understood to encompass determining a type of mailing.

The particular rules implemented to select a course of action (i.e., a type of remedial activity) in response to the reason for nondelivery and mailing or mailing type may vary from mailer to mailer. However, the following examples are illustrative of rules that may be employed:

(1) Initiate a telephone call to the intended recipient from the mailer's customer service department for promotional returned mail or account statements where nondeliverability is due to error or omission in the address.

(2) Initiate an account collection procedure for a returned bill where nondelivery is due to the intended recipient's having moved and left no forwarding address.

(3) Initiate a fraud investigation procedure when several returned mailpieces from the same billing mailing all have similar nonexistent addresses.

(4) Remove the intended recipient from the recipient database when the mailpiece is from a promotional mailing and the reason for nondelivery is that the recipient is deceased or the address is nonexistent or the intended recipient moved and left no forwarding address.

Some rules may take into account whether one or more mailpieces addressed to the intended recipient from prior mailings have been returned as undeliverable.

For example, where the mailings are for account statements and the reason for return is that the intended recipient moved with no forwarding order, (a) no action may be taken after a mailpiece from a first mailing is returned;

(b) a customer service telephone call is initiated after a mailpiece from the next (second) mailing is returned; and (c) the customer account is closed after a mailpiece from the following (third) mailing is returned.

At 210, the mailer, its contractor or agent may proceed with the remedial action decided upon at 208. When the remedial action produces updated address information for the intended recipient, the resulting information may be used to update a recipient database, which in turn may again be "cleansed". In some cases, the old address (i.e., the address which resulted in nondelivery) may be stricken from the recipient database unless it can be updated by conventional address updating/cleansing processes. In another alternative embodiment, the course of action to be taken is based upon the identity of the originating entity (e.g. could be any of a number of departments within a company).

Figure 3:
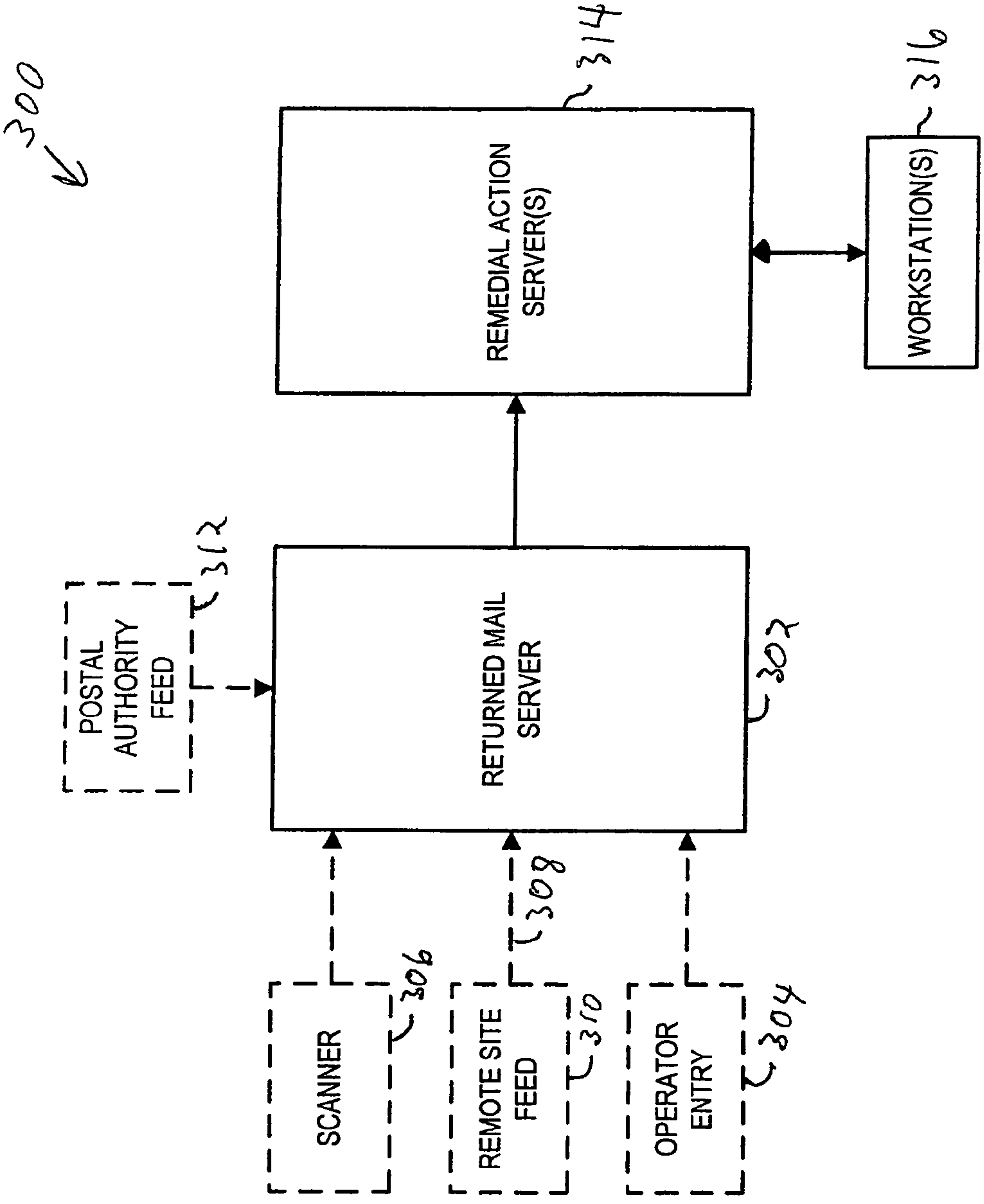
FIG. 3 is a block diagram of a computer system that processes returned mail in accordance with aspects of the processing flow of FIGS. 1 and 2.

FIG. 3 is a block diagram of a computer system 300 that processes returned mail in accordance with aspects of the processing flow of FIGS. 1 and 2.

The computer system 300 includes a returned mail server computer 302 which may perform at least some of the steps illustrated in FIG. 2. The returned mail server computer 302 may include one or more peripheral devices and/or sources of input such as those shown in phantom in FIG. 3 and enumerated below. For example, the returned mail server computer may be connected to one or more operator workstations 304 (e.g., client computers) to receive, from operators, input such as the reason for nondelivery of a returned mailpiece. The operator may also use the workstation to enter the original address and/or a corrected address applied to the mailpiece by the postal authority. Other activities that may be performed with such workstations are indications of the mailing of origin of a mailpiece and/or selection/search for an intended recipient's name that is stored in a database maintained by the returned mail server 302.

In another (or the same) embodiment, the returned mail server computer may have a scanner 306 in communication therewith. The scanner may be used to read information from the returned mailpieces. For example, the information may be an 11-digit zip code which effectively identifies the intended address, and consequently the intended recipient, of the returned mailpiece. When the scanner 306 inputs the 11-digit zip code to the returned mail server 302, the returned mail server 302 may automatically bring up a data entry screen for the intended recipient and the operator may then enter/select the reason for nondelivery endorsed on the mailpiece by the postal authority. For this purpose the operator may directly read the endorsed reason from the mailpiece or the operator may alternatively read the endorsed reason from an image of the mailpiece. (It is also contemplated that the reason for nondelivery may be marked on the mailpiece in machine-readable form such as by an additional barcode printed/affixed to the mailpiece by the postal authority once it has been determined by the postal authority that the mailpiece is undeliverable. Accordingly, the reason for nondelivery may also be input to the returned mail server 302 from the scanner 306 by machine-reading. Machine-reading of alphanumeric characters to identify the intended recipient, the mailing of origin, and/or the reason for nondelivery, is also contemplated.)

In addition, or alternatively, the returned mail server 302 may be connected by a suitable data communication connection 308, to receive a feed of data 310 from a remote site. In some embodiments, the feed may provide images of mailpieces scanned at the remote site. The images may be presented to an operator or operators at workstations co-located with the returned mail server to allow the operator(s) to read, from the images, information such as the reasons for nondelivery and/or the names and/or addresses of the intended recipient.

Figure 4:
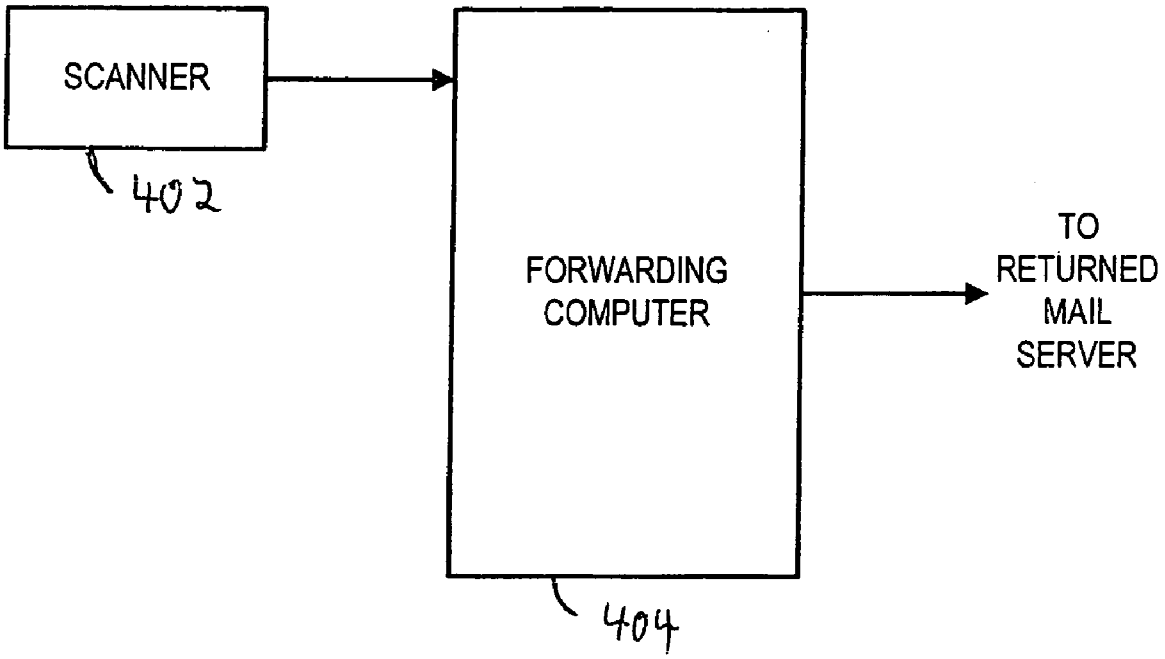
FIG. 4 is a block diagram that illustrates some aspects of one embodiment of the computer system of FIG. 3.

FIG. 4 is a block diagram that illustrates equipment that may be provided in accordance with some embodiments to provide the remote site data feed 310 shown in FIG. 3. Referring to FIG. 4, a scanner 402 may be coupled to a computer 404 which receives image data from the scanner 402 and forwards the image data to the returned mail server (FIG. 3, not shown in FIG. 4). The scanner 402 may be suitable for scanning and generating images of mailpieces. The scanner may be associated with equipment (not separately shown) that provides an automatic envelope feed path to transport returned mailpieces seriatim past the scanner so that the scanner can capture images of the mailpieces.

With the remote site data feed as illustrated in FIG. 4 and indicated at 310 in FIG. 3, the returned mailpieces may be received and scanned at one location, and the resulting image data may be transmitted to a second, remote location. At the second location, one or more human operators may review the images of the mailpieces to enter nondelivery reason data and/or other information to support (a) decisions regarding remedial action as described in connection with step 208 in FIG. 2 and/or (b) updating of the recipient database. In addition or alternatively, machine intelligence may be applied to the mailpiece images at the second location to enter some or all of the data required for decisions regarding remedial action.

Referring once more to FIG. 3, in accordance with embodiments to be described below the returned mail server 302 may receive a feed 312 of data from the postal authority regarding mail that is undeliverable.

Continuing to refer to FIG. 3, the computer system 300 may include another server (or servers) 314 which is (are) in communication with the returned mail server 302. The server 314 may provide support for remedial actions decided upon by the returned mail server 320. For example, the returned mail server 302 may supply, to the remedial action server 314, data that indicates and provides background information for customer service calls to be made to intended recipients of returned mailpieces. The remedial action server 314 may download to a customer service workstation or workstations 316 prompts or other data that guides or directs customer service representatives (not shown) at the workstations to initiate telephone calls to the intended recipients.

Figure 5:
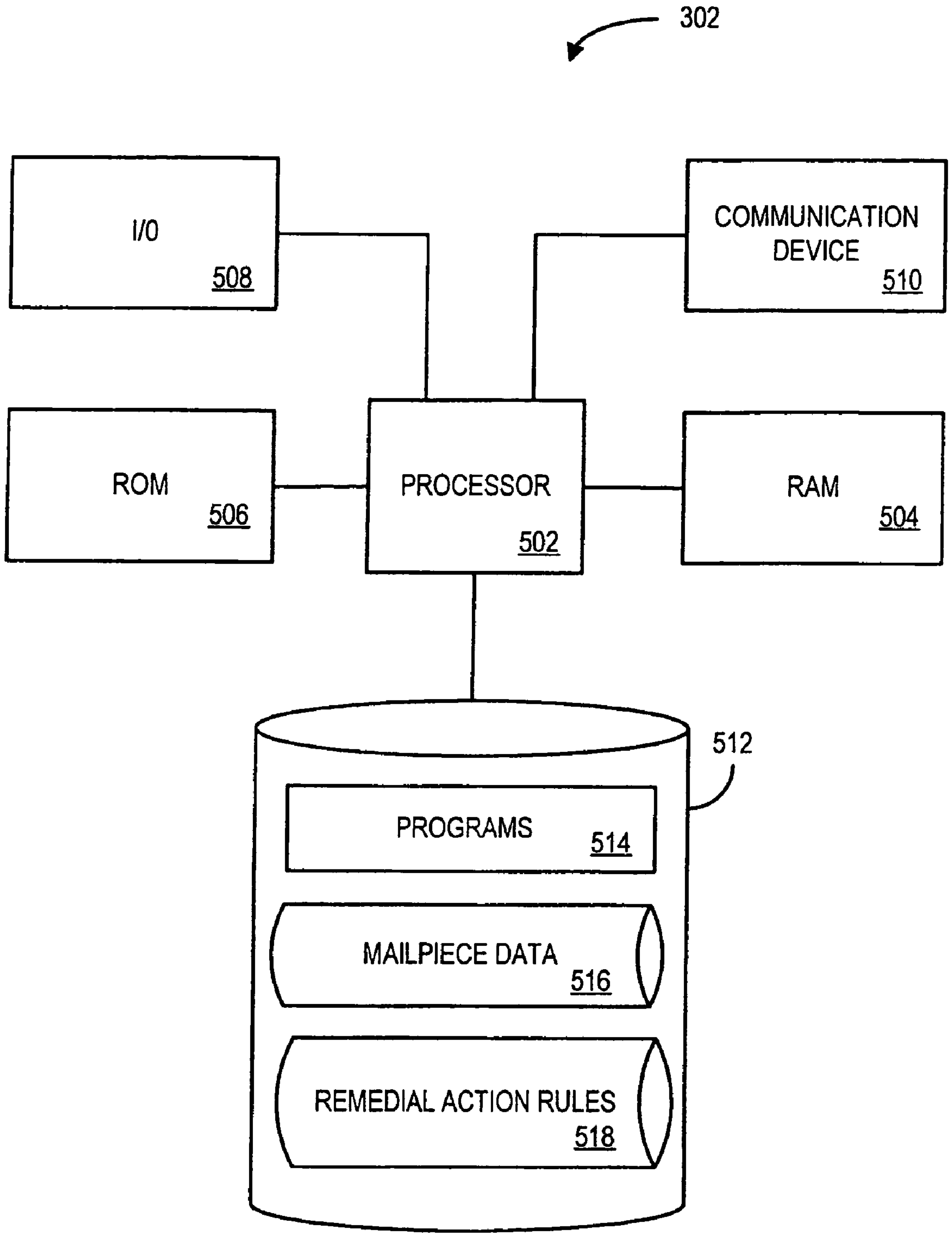
FIG. 5 is a block diagram of a returned mail server computer that is part of the system of FIG. 3.

FIG. 5 is a block diagram of the returned mail server computer 302 as provided in accordance with some embodiments.

The computer 302 includes a processor (or processors) 502, which may for example be any conventional microprocessor or microprocessors customarily used in server computers. Also included in the computer 302 are random access memory (RAM) 504 and read only memory (ROM) 506, both in communication with the processor 502. Further, the computer 302 may include one or more input/output devices 508 in communication with the processor 502. The input/output devices 508 may include, for example, one or more display screens, keyboards, mice.

Still further, the computer 302 may include one or more communication devices 510 in communication with the processor 502. The communication devices may allow for data communication between the computer 302 and one or more other computers, via, e.g., one or more communication networks which are not shown.

In addition, the computer 302 includes a storage device 512, which is in communication with the processor 502 and which may be constituted by one or more hard disk drives, CD-ROM drives, etc. The storage device 512 may store one or more programs 514 which may be loaded into RAM 504 from time to time to control operation of the processor 502 to thereby control operation of the computer 302. The programs 514 may include software instructions to cause the computer 302 to perform functions of the present invention, as described herein. Still further, the storage device 512 may store a database 516 of information concerning returned mailpieces and a database 518 of rules to be applied in determining remedial actions to be taken with respect to various categories of returned mailpieces.

Figure 6:
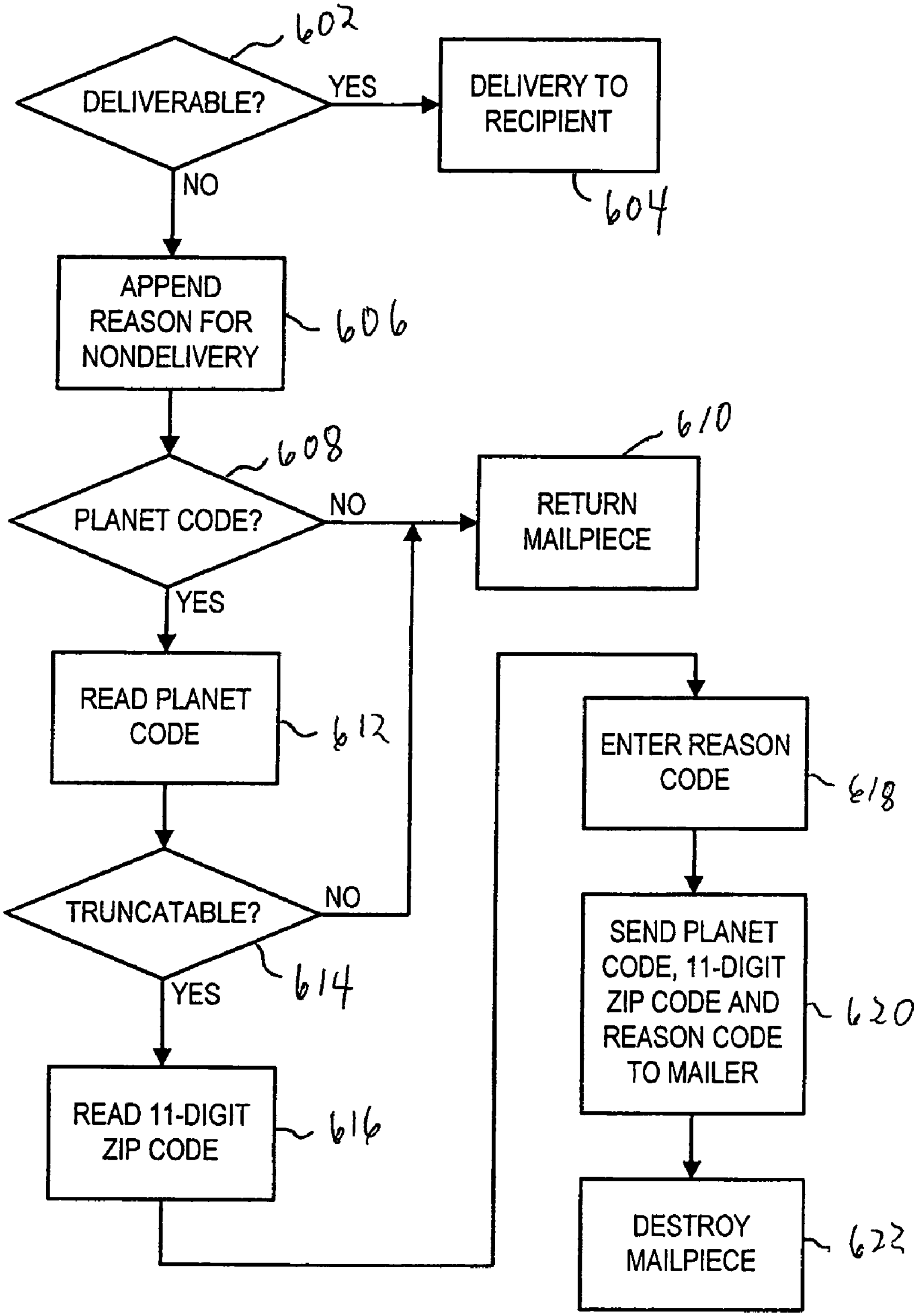
FIGS. 6 and 7 are flow charts that illustrate details of aspects of an alternative to the processing flow of FIG. 1.

As briefly referred to above, in some embodiments, the returned mail server 302 may receive from the postal authority a feed of data regarding undeliverable mailpieces. In some embodiments, the postal authority may provide this feed of data in lieu of returning the undeliverable mailpieces to the mailer. FIG. 6 is a flow chart that illustrates a process that may be performed by the postal authority in connection with such embodiments.

At 602 in FIG. 6, the postal authority determines whether a mailpiece is deliverable. If the mailpiece is deliverable, then it is delivered to the recipient, as indicated at 604. If the mailpiece is not deliverable, the postal authority appends the reason for nondelivery to the mailpiece, as indicated at 606. Then, at 608, it is determined whether the undeliverable mailpiece carries a PLANET code or other code that may be read to determine whether returning of the mailpiece is required. If there is no such code, then the mailpiece is returned to the mailer, as indicated at 610. If there is such a code, then it is read by scanning the mailpiece, as indicated at 612. From the code, a determination 614 may be made by the postal authority (or by its computer, which is not shown, by database lookup concerning the indicated mailer and/or mailing) as to whether the postal authority and the mailer of the mailpiece have by prior arrangement agreed that return of undeliverable mailpieces (at least from the mailing in question) is not required, and that data may be submitted to the mailer in lieu of return of the mailpiece. In this regard, the term "truncation" will be introduced to signify that an undeliverable mailpiece is destroyed rather than returned, and that data is sent to the mailer in place of the mailpiece. Thus at 614 it is determined whether the mailpiece is truncatable. If not, the undeliverable mailpiece is returned to the mailer as indicated at 610. However, if the mailpiece is truncatable, then data such as an 11-digit zip barcode on the mailpiece is read (616 in FIG. 6) as a unique identifier (possibly with additional data in the PLANET code) for the mailpiece. Further, a postal authority employee may read the reason for nondelivery from the mailpiece and may enter (618) a corresponding reason code to associate the reason code with the mailpiece identifier. The postal authority may then send data such as the PLANET code, 11-digit zip and nondelivery reason code to the mailer, as indicated at 620. The mailpiece may then be destroyed (622), per agreement with the mailer.

In this embodiment, the postal authority may save the time and expense of physically returning undeliverable mail, while instead providing to mailers useful data concerning the reason for nondelivery of mailpieces. In some embodiments, in addition or alternatively, the postal authority may capture an image of the face of the mailpiece, and may provide this image data to the mailer in addition to or instead of the data referred to at 620 and in lieu of returning the mailpiece.

According to a variation in the process of FIG. 6, it may be determined whether a mailpiece is truncatable before the reason for nondelivery is appended to the mailpiece. If the mailpiece is truncatable, then the reason for nondelivery is not appended to the mailpiece, but instead data or a code representing the reason for nondelivery is electronically transmitted to the mailer in association with data (taken e.g. by scanning the mailpiece) that uniquely identifies the mailpiece. The mailpiece is destroyed before, during or after transmission of this information. If the mailpiece is found not to be truncatable, then the reason for nondelivery is appended thereto and the mailpiece is returned to the mailer.

Figure 7:
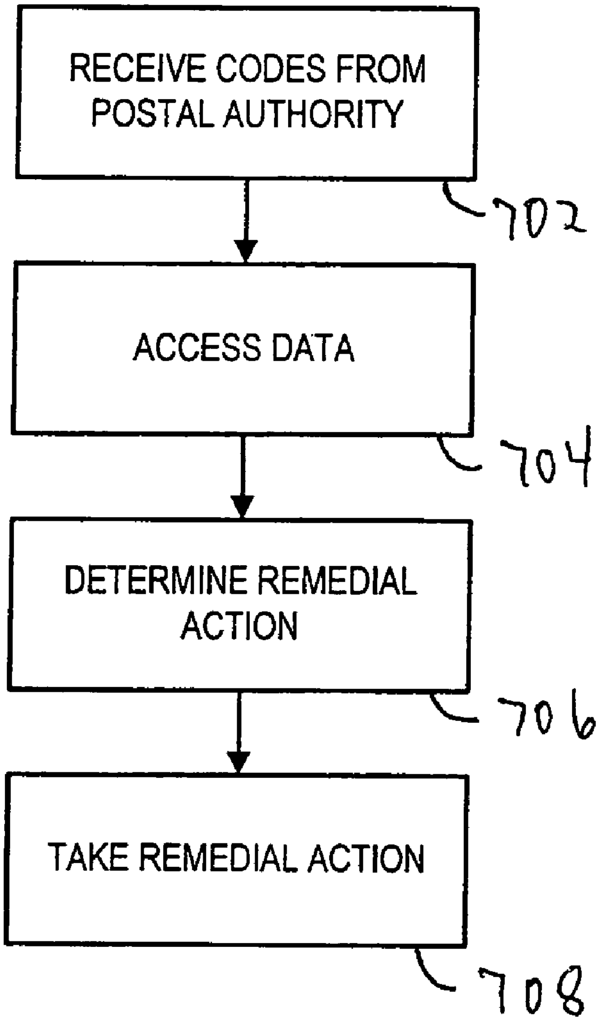

FIG. 7 is a flow chart that illustrates a process that may be performed by or on behalf of a mailer in embodiments in which the postal authority provides data to the mailer in lieu of returning undeliverable mail. At 702, the mailer (or a contractor or agent for the mailer) receives from the postal authority (e.g., at server computer 302, FIG. 3) the codes referred to at 620 in FIG. 6. (In addition or alternatively, the mailer may receive an image of the undeliverable mailpiece.) At 704, the server computer 302 accesses data to indicate, e.g., the mailing of origin for the mailpiece referred to in the received data, the account number of the intended recipient of the mailpiece, etc. At 706, the server computer 302 may reference one or more rules to determine, based for example on the reason for nondelivery and the mailing of origin of the mailpiece, what remedial action should be taken. At 708 the remedial action is taken, e.g., with support and management by the remedial action server 314 (FIG. 3).

A number of embodiments of the present invention have been described in terms of reference to a postal authority and the delivery of mail pieces. However, the embodiments may alternatively comprise any carrier system such as an express letter or package carrier system for the shipment/delivery of any deliverable item such as letters, postcards, packages parcels and the like. Such carriers may conduct shipping campaigns for a group of items that may be somehow associated with each other. The words "comprise," "comprises," "comprising," "include," "including," and "includes" when used in this specification and in the following claims are intended to specify the presence of stated features, elements, integers, components, or steps, but they do not preclude the presence or addition of one or more other features, elements, integers, components, steps, or groups thereof.

A number of embodiments of the present invention have been described. Nevertheless, it will be understood that various modifications may be made without departing from the spirit and scope of the invention. Other variations relating to implementation of the functions described herein can also be implemented. Accordingly, other embodiments are within the scope of the following claims.

What is claimed is:

1. A method comprising:

receiving returned items from a carrier, each of said returned items having been included in a respective one of a plurality of shipping campaigns and having been determined by the carrier to be undeliverable;

after said receiving, determining for each of said returned items at least one of (a) a respective shipping campaign to which said each item belonged, and (b) a reason why said each returned item was determined to be undeliverable; and selecting a course of action based on at least one of said determined respective shipping campaign and said determined reason, wherein the carrier comprises a postal authority, the items comprise mailpieces and the shipping campaigns comprise mailings, further comprising:

entering said determined reason in a database; and reading information from said each returned mailpiece to determine said reason.

2. The method according to claim 1, further comprising:

scanning said each returned mailpiece to generate an image, said scanning performed at a first location;

transmitting said image to a second location that is remote from said first location; and reading information from said image at said second location to determine said reason.

* * * * *